United States Patent [19]

Ishikawa

[11] Patent Number: 5,061,029
[45] Date of Patent: Oct. 29, 1991

[54] OPTICAL WAVEGUIDE ARRAY, PRINTER, AND METHOD OF MANUFACTURING THE SAME

[75] Inventor: Yujiro Ishikawa, Nagoya, Japan

[73] Assignee: Brother Kogyo Kabushiki Kaisha, Aichi, Japan

[21] Appl. No.: 597,445

[22] Filed: Oct. 15, 1990

[30] Foreign Application Priority Data

Oct. 19, 1989 [JP] Japan .................... 1-272684

[51] Int. Cl.⁵ .................... G02B 6/10; G03B 27/00
[52] U.S. Cl. ........................ 385/132; 385/14; 355/1
[58] Field of Search .......... 350/96.11, 96.12, 96.24, 350/96.30, 96.34, 320; 355/1

[56] References Cited

U.S. PATENT DOCUMENTS 3,930,103 12/1975 Chimura et al. .............. 350/96.30
4,902,086 2/1990 Henry et al. .................. 350/96.12

FOREIGN PATENT DOCUMENTS 0281800 9/1988 European Pat. Off. ..... 350/96.11 X
62-153804 7/1987 Japan ......................... 350/96.11 X
64-59302 3/1989 Japan ......................... 350/96.11 X Primary Examiner—Brian Healy
Attorney, Agent, or Firm—Kane, Dalsimer, Sullivan, Kurucz, Levy, Eisele and Richard

[57] ABSTRACT

An optical waveguide array comprises a base plate provided with a plurality of channels and a cover covering an open side of the base. The channels are filled with core members. The base plate and the cover are made by an injection molding method. At least one of the opposing surfaces of the plate and the cover are formed of a material having a refractive index of $n_1$ which is smaller than a refractive index $n_2$ of material forming the core.

13 Claims, 3 Drawing Sheets

OPTICAL WAVEGUIDE ARRAY, PRINTER, AND METHOD OF MANUFACTURING THE SAME

BACKGROUND OF THE INVENTION

This invention relates to an optical waveguide array provided with a plurality of optical waveguides for transferring image information and to a method of manufacturing the optical waveguide array.

A conventional optical recorder such as an optical printer is operated in the following manner.

Laser beams are emitted from a semiconductor laser generator into a collimator by which the laser beams are shaped as parallel beams. The parallel beams are then deflected at an equiangular speed by a polygon mirror. The laser beams deflected by the polygon mirror are emitted to a plane reflecting plate through an f-$\theta$ lens and, thereafter, the laser beams are focussed on a photosensitive drum rotated at a constant speed and scanned thereon along a line parallel to the rotation axis of the photosensitive drum.

However, in such a conventional optical recorder, the laser beams are deflected at an equiangular speed by the polygon mirror and, on the contrary, the beams scan on the photosensitive drum at a constant speed. For this reason, in the described conventional technique, it is obliged to utilize an optical lens system such as an f-$\theta$ lens, which is expensive, for converting the equiangular motion of the laser beams to the constant speed motion for the scanning operation.

In order to obviate this defect, a prior art further provides an optical printer utilizing an optical fiber means such as disclosed in the Japanese Patent Laid-open Publication No. 60-194417. In such an optical printer, the incident light from one end of a cylindrical optical fiber means is subjected to circle-to-line conversion and the converted light is emitted from the linear other end of the optical fiber means and a latent image is formed on the photosensitive drum.

However, in order to manufacture such optical fiber means, it is necessary to bundle a numerous number of optical fibers (for example, 2500 numbers in a case where an A-4 size paper is printed) with high accuracy, thus being troublesome.

SUMMARY OF THE INVENTION

An object of the present invention is to substantially eliminate the defects or drawbacks encountered in the prior art and to provide an optical waveguide array having an optical wave guiding property substantially identical to that obtained in a usual optical fiber device and to provide a method of easily manufacturing the optical waveguide array.

This and other objects can be achieved according to this invention, in one aspect, by providing an optical waveguide array comprising a base plate provided with a plurality of channels each having an inner surface made of a material having a first refractive index of $n_1$, a cover member having one surface to cover one surface of the base plate to which the channels are opened to thereby form the channels as closed spaces, the one surface of the cover member being formed of a material having a first refractive index of $n_1$, and a core member filled up in each of the spaces and having a second refractive index of $n_2$ being larger than the first refractive index $n_1$.

In another aspect of this invention, there is provided a method of manufacturing an optical waveguide array comprising the steps of preparing a base plate provided with a plurality of channels each having an inner surface made of a material having a first refractive index of $n_1$, applying a cover member having one surface so as to cover one surface of the base plate to which the channels are opened and bonding one surface of the cover member to one surface of the base plate to thereby form the channels as closed spaces, the one surface of the cover member being formed of a material having a first refractive index of $n_1$, and filling a core having a second refractive index of $n_2$ in the spaces, the second refractive index $n_2$ being larger than the first refractive index $n_1$.

The thus formed optical waveguide array is effectively applicable to an optical printer.

According to this invention having the characters described above, the optical waveguide array is manufactured by preparing the base plate provided with a plurality of channels and the cover member to cover the base plate. The closed channels are filled up with core members as waveguides. The base plate and the cover member are made of materials having the refractive index $n_1$ which is smaller than the refractive index $n_2$ of the material forming the core member. The thus formed optical waveguide array can be effectively utilized for an optical printer.

BRIEF DESCRIPTION OF THE DRAWINGS

For a better understanding of this invention and to show how the same is carried out, reference is now made, by way of preferred embodiment, to the accompanying drawings, in which.

DESCRIPTION OF THE PREFERRED EMBODIMENT

Figure 1A:
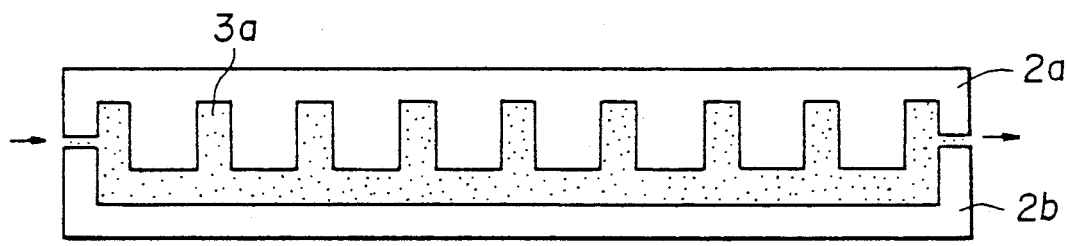
FIGS. 1(A) to 1(E) represent sequential steps of a method of manufacturing an optical waveguide array according to this invention.
Figure 1B:
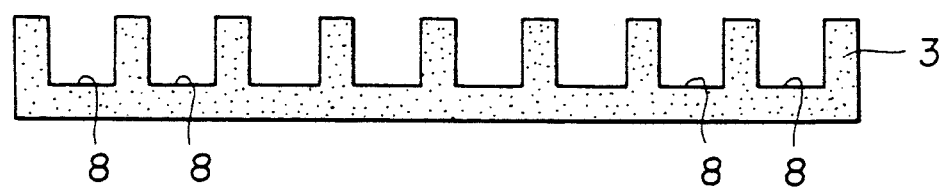
Figure 1C:
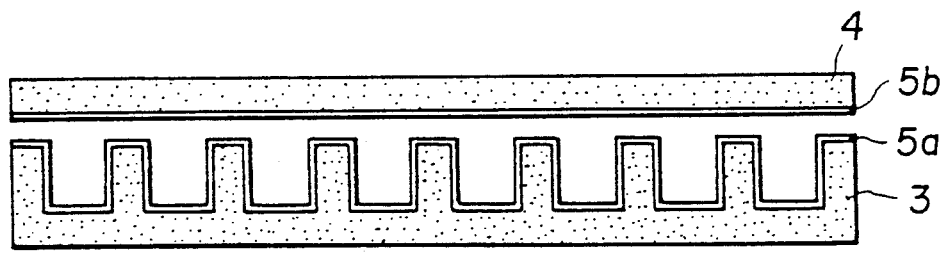
Figure 1D:
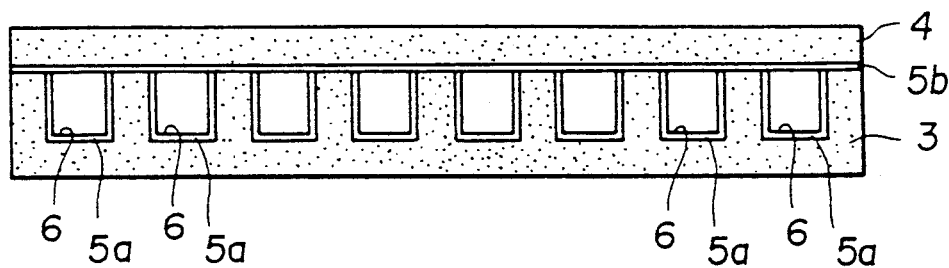
Figure 1E:
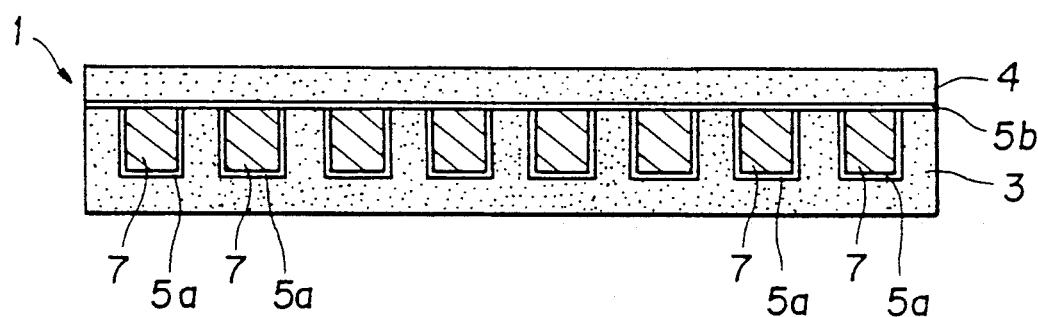
Figure 2:
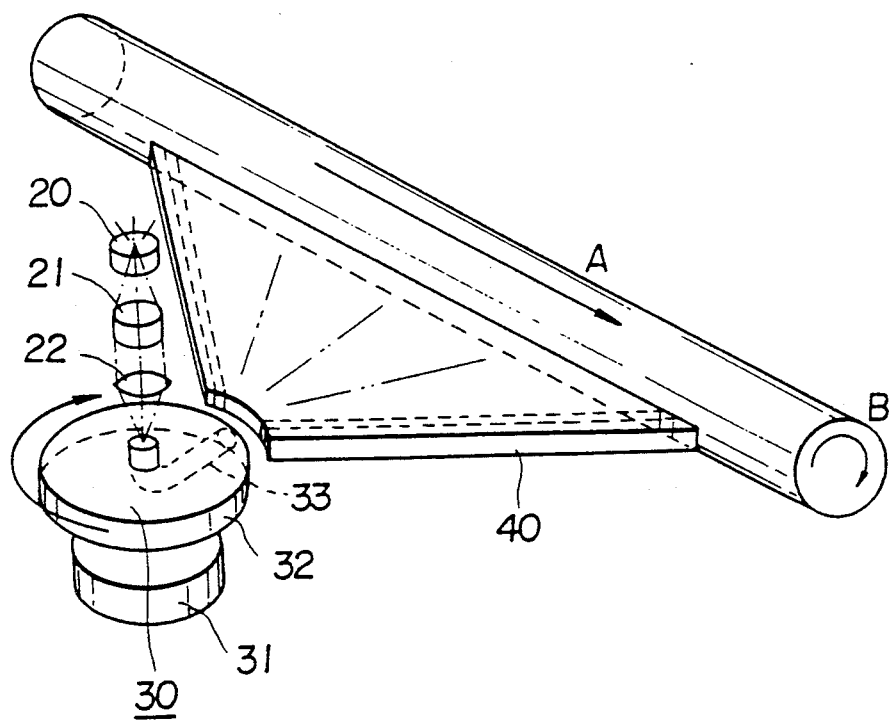
FIG. 2 is a perspective view of an optical printer utilizing the optical waveguide array manufactured by the method represented by FIG. 1.

Referring to FIG. 1 representing the sequential steps of the method of manufacturing an optical waveguide array 1 (light guide array) of this invention, as shown in FIG. 1(A), a first mold half 2a and a second mold half 2b are positionally vertically aligned and a resin such as polycarbonate resin 3a melted at high temperature is poured into a cavity between the first and second mold halves 2a and 2b, which are of the shape corresponding to an optical waveguide array 40 as shown in FIG. 2. After pouring the polycarbonate resin 3a, it is cooled and hardened as a mold product. Thereafter, the hardened polycarbonate is taken out as a plate-like base 3 provided with a plurality of grooves 8 as shown in FIG. 1(B). Such molding process is so-called an injection molding method. As shown in FIG. 1(C), the base 3 and a cover 4 made of polycarbonate resin by substantially the same method as that of forming the base 3 are dipped respectively into resin solution such as vinylidene fluoride solution or fluoroacrylic (acryl fluoride) solution. The base 3 and the cover 4 taken out from the solutions are subjected to ultraviolet ray curing treatment to thereby form clads 5a and 5b having a refractive index $n_1$ on the substantially opposing surfaces of the base 3 and the cover 4. The thus formed base 3 and cover 4 are mated as shown in FIG. 1(D) and pressurized from the vertical, as viewed, direction, whereby the facing clads 5a and 5b of the base 3 and the cover 4 are bonded to each other and a basic structure provided with hollow chanels 6 is formed. One end of the thus formed basic structure is dipped into a methacrylic resin solution having a refractive index $n_2$ and the other end thereof are vaccumed. The basic structure in this state is left as it is for a predetermined time to form an optical waveguide array 1, as shown in FIG. 1(E), having the channels 6 filled with cores 7 made of the methacrylic resin.

The application of the optical waveguide array provided with a plurality of optical waveguides and manufactured by the method of this invention described above to an optical printer will be explained hereunder.

Figure 3:
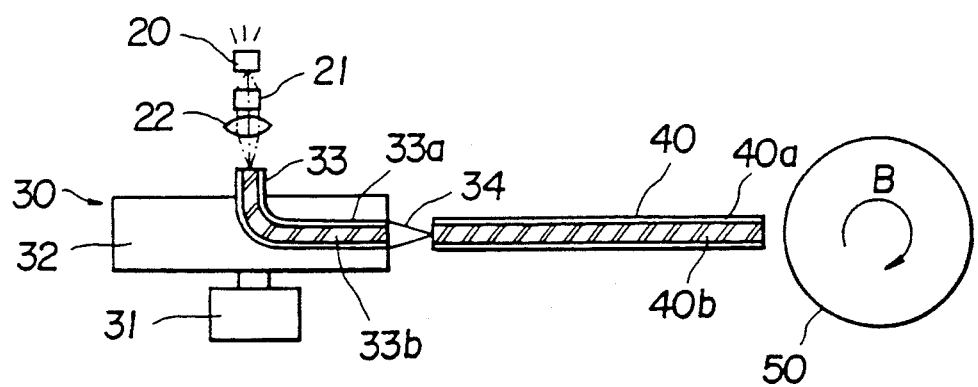
FIG. 3 is a sectional view of the optical printer shown in FIG. 2.

FIGS. 2 and 3 represent an example of an optical printer to which the optical waveguide array according to this invention is applied.

A point light source 20 is of the type such as a laser diode (LD) or semiconductor lighting source such as an LED and the light emitted from the light source 20 in accordance with an image information is guided to an end face of a light incident port of an optical waveguide 33 of a scanner 30 through a collimator lens 21 and a light condenser lens 22. The scanner 30 is composed of an electric motor 31 and a rotary member 32 in which the optical waveguide 33 is embedded and which is rotated by the motor 31 at a constant speed. The optical waveguide 33 has an inlet arranged on the same axis as that of the rotation center of the scanner 30 and has an outlet extending in the radial direction of the rotary member 32 to the outer periphery thereof.

The optical waveguide 33 of FIGS. 2 or 3 is composed of two materials having different refractive indexes with respect to the light from the point light source 20 as is identical to that of the known optical fiber means, and in the optical waveguide 33, the clad 33a having refractive index $n_1$ is arranged so as to surround the core 33b having refractive index $n_2$ ($n_1 < n_2$).

A condenser lens 34 is disposed at one end surface of the optical waveguide 33 for converging light beams transferring in the optical waveguide 33 to a light incident port of the optical waveguide array 40. The optical waveguide array 40 is manufactured by the method described with reference to FIG. 1 and the light incident port has an arcuate shape corresponding to the outer periphery of the scanner 30 so as to partially surround the scanner 30. The optical waveguide array 40 is provided with the other end face arranged parallelly along the bus direction of a photographic recording medium 50 so as to effectively carry out the circle-to-line conversion of the light angle. The optical waveguide array 40 is also composed of a clad 40a having refractive index $n_1$ arranged so as to surround a core 40b having refractive index $n_2$.

The operation of the thus constructed optical waveguide array 40 will be described hereunder.

The point light source 20 is flashed by a drive means, not shown, in response to image signals. As described hereinbefore, the light incident port of the optical waveguide 33 is disposed on the rotation axis of the rotary member 32, so that the light from the point light source 20 is always emitted into the optical waveguide 33. The light from the point light source 20 is converged by the condenser lens 22 so that the diameter of the light beam is made minimum at the end face of the light incident port. Accordingly, the light is never shifted from the end face of the light incident port even if the positional relationship between the point light source 20 and the optical waveguide 33 are mutually slightly offset.

In the optical waveguide 33, the light is substantially totally reflected on the interface between the clad 33a and the core 33b on the basis of the relationship between the refractive indexes $n_1$ and $n_2$ of the clad 33a and the core 33b and the light passes thereafter in the core 33b.

Then the light is condensed by the condenser lens 34 at an outlet end portion of the optical waveguide 33, and a diameter of condensed light is formed sufficently smaller than that of a inlet port of the optical waveguide array 40.

A light signal representing one picture element from the point light source 20 is flashed in synchronizm with the intervals between the respective inlet ports of the waveguides of the optical waveguide array 40, so that the light beams can enter into the respective waveguides of the optical waveguide array 40 in accordance with the rotation of the scanner 30. The incident light entering in the optical waveguide array 40 is transferred therein in the manner identical as that of the conventional optical fiber means and the light outgoes from the outlet end with an anglar aperture NA ($NA = \sqrt{n_2^2 - n_1^2}$), which is determined by the relationship between the refractive indexes $n_1$ and $n_2$ of the clad 40a and the core 40b.

According to the operations described above, the light beams emitted from the light source 20 and flashed in response to the image signals are scanned along the bus direction, i.e. arrowed direction A shown in FIG. 2, of the photographic recording medium 50 to thereby write the image thereon. The photographic recording medium 50 is intermittently rotated in an arrowed direction B in FIG. 2 after the completion of one line scanning with respect to each line and such light line scanning is repeated to thereby carry out the image recording operation on the photographic recording medium 50.

According to the described embodiment of the optical waveguide array of this invention, the trouble of bandling the optical fibers such as in the conventional optical fiber means can be eliminated, thus easily manufacturing the array as well as achieving the substantially the same light wave guiding ability as that achieved by the conventional optical fiber means. In addition, according to the manufacturing method of this invention, the base 3 is molded by a molding device, so that the method is suitable for the mass production of the optical waveguide arrays.

Furthermore, in the foregoing embodiment, the clad layers 5a and 5b having the refractive index $n_1$ are formed on the surfaces of the base 3 and the cover 4, but in a modified embodiment, both of the base 3 and the cover 4 or at least one of the base 3 and the cover 4 may be made themselves of material having the refractive index $n_1$.

It is to be understood that this invention is not limited to the described embodiment and many other changes and modifications may be made without departing from the scope of the appended claims.

What is claimed is:

1. An optical printer comprising:
   a rotatable scanner for emitting radially a light signal entered along an its rotational axis in accordance with an image information, an optical waveguide array for guiding the light signal emitted from the scanner, and a photosensitive recording medium for writing an image, disposed at an end portion of the optical waveguide array, said optical waveguide array having a base plate means provided with a plurality of channels each having an inner surface made of a material having a first refractive index of $n_1$, a cover means having one surface to cover one surface of said base plate means to which said channels are opened to thereby form said channels as closed spaces, the one surface of said cover means being formed of a material having a first refractive index of $n_1$, and a core means filled up in said spaces and having a second refractive index of $n_2$ being larger than the first refractive index $n_1$.

2. An optical waveguide array comprising:
a base plate provided with a plurality of channels on one surface thereof;
a first clad layer applied to the one surface of the base plate and made of a material having a first refractive index of n1;
a cover plate having one surface covering the one surface of the base plate so as to cover said channels to form closed spaces;
a second clad layer applied to the one surface of said cover plate and made of a material having a first refractive index of n1; and
a core means filing up the closed spaces of the channels and made of a material having a second refractive index of n2, wherein n2 is larger than the first refractive index of n1.

3. An optical waveguide array according to claim 2, wherein said core means is made of methacrylic resin.

4. An optical waveguide array according to claim 2, wherein said first and second clad layers are made of vinylidene fluoride resin.

5. An optical waveguide array according to claim 2, wherein said first and second clad layers are made of fluoracrylic resin.

6. A method of manufacturing an optical waveguide array comprising a base plate provided with a plurality of channels on one surface thereof and a cover plate having one surface applied to the one surface of the base plate so as to cover the channels to form closed spaces, said method comprising the steps of:
dipping the base plate and the cover plate into a resin solution to form first and second clad layers respectively on the one surfaces of the base plate and the cover plate;
curing the first and second clad layers by subjecting them to an ultraviolet ray so as to provide a first refractive index of n1 to the first and second clad layers;
applying, after curing, the cover plate to the base plate so as to form the channels of the base plate as closed spaces; and
filling a core made of a material having a second refractive index of n2 into the closed spaces of the channels, said second refractive index n2 being larger than the first refractive index n1.

7. A method according to claim 6, wherein said first and second clad layers are made of vinylidene fluoride resin.

8. A method according to claim 6, wherein said first and second clad layers are made of fluoroacrylic resin.

9. A method according to claim 6, wherein the core is formed by dipping one end of the base plate provided with the channels into a resin solution, vacuuming the resin solution from another end of the base plate so as to fill the chanmels with the resin solution and curing the resin solution so as to form the core having the second refractive index of n2.

10. An optical printer according to claim 1, wherein at least one of said base plate means and said cover means is entirely made of material having the first refractive index of n1.

11. An optical printer according to claim 1, wherein said inner surface of each of said channels of said base plate means and the one surface of said cover means are made of vinylidene fluoride resin.

12. An optical printer according to claim 1, wherein said inner surface of each channels of said base plate means and the one surface of said cover means are made of fluoracrylic resin.

13. An optical printer according to claim 1, wherein said core means is made of methacrylic resin.

* * * * *